June 24, 1947.   H. M. MARTIN   2,422,973
ROTATION INDICATING SIGNAL SYSTEM AND CONTROL DEVICE
Filed Nov. 17, 1944
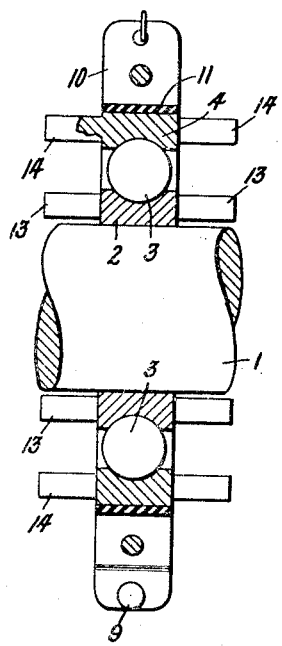
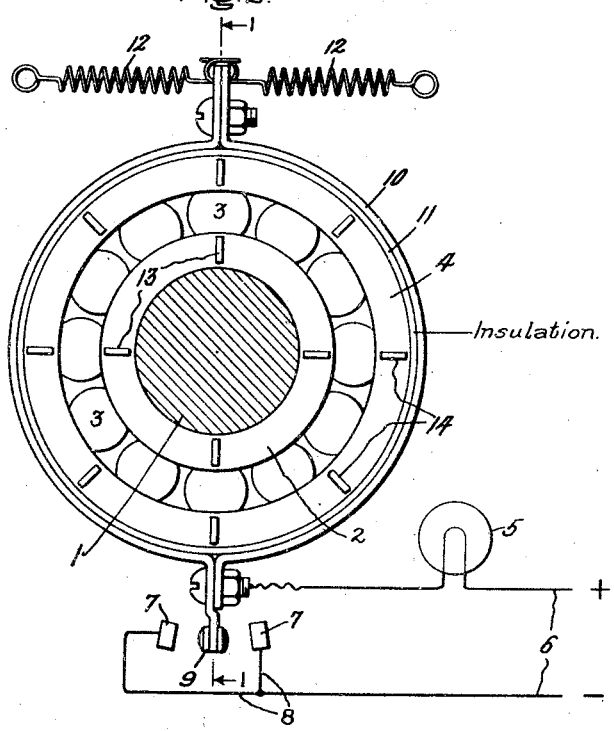
Inventor:
Harold M. Martin,
by Harry E. Dunham
His Attorney.

Patented June 24, 1947

2,422,973

UNITED STATES PATENT OFFICE 2,422,973

ROTATION INDICATING SIGNAL SYSTEM AND CONTROL DEVICE

Harold M. Martin, Schenectady, N. Y., assignor to General Electric Company, a corporation of New York Application November 17, 1944, Serial No. 563,915

7 Claims. (Cl. 200—153)

1

My invention relates to rotation indicating signal systems and control devices, and particularly to an arrangement for indicating by visual or other means when a rotatable member is in operation.

An object of my invention is to provide an improved rotation indicating signal system.

Another object of my invention is to provide an improved rotation indicating visual signal system operable for either direction of rotation.

A further object of my invention is to provide an improved control device for a rotation indicating signal system.

Further objects and advantages of my invention will become apparent from the following description referring to the accompanying drawing, and the features of novelty which characterize my invention will be pointed out with particularity in the claims annexed to and forming a part of this specification.

In the drawing, Fig. 1 is a sectional view along line 1—1 of Fig. 2 illustrating an embodiment of my improved control device applied in an embodiment of my improved rotation indicating signal system; and Fig. 2 is an end view of the arrangement shown in Fig. 1.

Referring to the drawing, I have shown an embodiment of my improved rotation indicating signal system and control device applied to a rotatable member shaft 1 and including a bearing of the antifriction type having an inner race 2 fixedly mounted on the rotatable member shaft 1 and having antifriction ball bearings 3 with an outer bearing race 4 arranged around the inner bearing race 2. In this arrangement a signal device, such as a lamp 5, is adapted to provide a visual signal by being electrically connected to a source of electrical power supply 6 on operation of the rotatable member in either direction of rotation through suitable electrical contacts. These electrical contacts include a pair of relatively stationary contacts 7 which are electrically connected together by a suitable conductor 8 and connected to one side of a source of electrical power supply, and a third relatively movable electrical contact 9 connected to the other side of the electrical power supply and mounted on the bearing. This movable contact is secured to a clamp 10 which is arranged around the outside of the outer bearing race 4 and is insulated therefrom by a suitable ring of insulating material 11 and is adapted to be centered between the pair of stationary contacts 7 and out of electrical contact therewith by a pair of biasing coil springs 12 connected to the clamp 10 and extending in opposite

2 directions for exerting a centering force thereon. The visual signal device 5 is adapted to provide an indication of rotation of the shaft 1 in response to the closure of the circuit by the contacts 9 and 7 for either direction of rotation of the shaft 1 in response to the rotation thereof by movement of the outer bearing race 4 by frictional drag in the bearings between the inner race 2 and the outer race 4. The torque transmitted to the outer bearing race 4 from the inner race 2 is increased by a tangential component of force transmitted therebetween by air currents set up by vanes 13 on the inner race 2 when this air impinges on vanes 14 on the outer race 4. This type visual signalling device is particularly important in certain applications where a rotatable member may be driven through a belt drive, and it is desirable to provide an indication of the rotation of the rotatable member which will be an indication of whether or not the belt is broken so as to warn the operator of such a condition and prevent possible destructive speeds of the driving device which might result if the belt were broken and the load removed from the driving device. My improved rotation indicating system and control device may be made in a very compact form and applied to a driven member with a minimum of space and expense.

While I have illustrated and described a particular embodiment of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent in the United States is:

1. A rotation indicating signal system control device including a rotatable member, a bearing mounted on said rotatable member, electrical contacts biased out of electrical contact with each other on non-rotation of said rotatable member and operable to closed circuit position in response to rotation of said rotatable member in either direction, means for electrically connecting a source of electrical power supply to said contacts, means including vanes on said bearing for transmitting torque on rotation of said rotatable member for operating said electrical contacts to a closed circuit position, and means connecting a signal device in circuit with said contacts for indicating rotation of said rotatable member by closure of said electrical circuit between said contacts.

2. A rotation indicating signal system control device including a rotatable member, a bearing mounted on said rotatable member, a pair of stationary spaced apart electrical contacts, a third electrical contact mounted on and insulated from said bearing and arranged between said pair of stationary contacts, means for exerting a centering force on said third contact for centering said third electrical contact between said pair of stationary contacts out of electrical contact therewith, means for electrically connecting together said pair of stationary contacts, means for electrically connecting a source of electrical power supply to said third contact and to said pair of stationary contacts, means including vanes on said bearing for transmitting torque on rotation of said rotatable member for operation of said electrical contacts to a closed circuit position, and means for connecting a signal device in circuit with said contacts for indicating rotation of said rotatable member by closure of said electrical circuit between said third contact and one of said stationary contacts.

3. A rotation indicating signal system device including a rotatable member, a bearing mounted on said rotatable member, a pair of stationary spaced apart electrical contacts, a third electrical contact mounted on and insulated from said bearing and arranged between said pair of stationary contacts, means including a pair of springs extending in opposite directions for exerting a centering force on said third electrical contact for centering said third contact between said pair of stationary contacts out of electrical contact therewith, means for electrically connecting together said pair of stationary contacts, means for electrically connecting a source of electrical power supply to said third contact and to said pair of stationary contacts, means including vanes on said bearing for transmitting torque on rotation of said rotatable member for operating said electrical contacts to a closed circuit position, and means for connecting a signal device in circuit with said contacts for indicating rotation of said rotatable member on closure of said electrical circuit between said third contact and one of said stationary contacts by movement of said third contact by frictional drag in said bearing on rotation of said rotatable member in either direction.

4. A rotation indicating signal system device including a rotatable member, a bearing having an inner bearing race fixedly mounted on said rotatable member, antifriction bearings and an outer bearing race arranged around said inner race, means including a clamp secured to and insulated from said outer bearing race, a pair of stationary spaced apart electrical contacts, a third electrical contact mounted on said clamp and arranged between said pair of stationary contacts, means including a pair of biasing coil springs extending in opposite directions connected to said clamp for exerting a centering force on said outer bearing race through said clamp for centering said third electrical contact between said pair of stationary contacts out of electrical contact therewith, means for electrically connecting together said pair of stationary contacts, means for electrically connecting a source of electrical power supply to said third contact and to said pair of stationary contacts, and means for connecting a signal device in circuit with said contacts for operation by closure of said electrical circuit between said third contact and one of said stationary contacts on movement of said outer bearing race by friction in said bearings on rotation of said rotatable member in either direction.

5. A rotation indicating signal system device including a rotatable member, a bearing having an inner bearing race fixedly mounted on said rotatable member, antifriction bearings and an outer bearing race arranged around said inner race, a pair of stationary spaced apart electrical contacts, a third electrical contact mounted on and insulated from said outer bearing race and arranged between said pair of stationary contacts, means for exerting a centering force on said third electrical contact for centering said third contact between said pair of stationary contacts out of electrical contact therewith on non-rotation of said rotatable member, means for electrically connecting together said pair of stationary contacts, means for electrically connecting a source of electrical power supply to said third contact and to said pair of stationary contacts, means including vanes on said inner and outer bearing races for transmitting torque therebetween on rotation of said rotatable member for operation of said electrical contacts to a closed circuit position, and means for connecting a signal device in circuit with said contacts for indicating rotation of said rotatable member on closure of said electrical circuit between said third contact and one of said stationary contacts on movement of said outer bearing race by friction in said bearings on rotation of said rotatable member in either direction.

6. A rotation indicating signal system device including a rotatable member, a bearing having an inner bearing race fixedly mounted on said rotatable member, antifriction bearings and an outer bearing race arranged around said inner race, a pair of stationary spaced apart electrical contacts, a third electrical contact mounted on and insulated from said outer bearing race and arranged between said pair of stationary contacts, means for exerting a centering force on said third electrical contact for centering said third contact between said pair of stationary contacts out of electrical contact therewith on non-rotation of said rotatable member, means for electrically connecting together said pair of stationary contacts, means for electrically connecting a source of electrical power supply to said third contact and to said pair of stationary contacts, means including vanes on each of said bearing races for transmitting torque therebetween, and means for connecting a signal device in circuit with said contacts for indicating rotation of said rotatable member on closure of said electrical circuit between said third contact and one of said stationary contacts on movement of said outer bearing race on rotation of said rotatable member in either direction.

7. A rotation indicating signal system device including a rotatable member, a bearing having an inner bearing race fixedly mounted on said rotatable member, antifriction ball bearings and an outer bearing race arranged around said inner race, means including a clamp secured to and insulated from said outer bearing race, a pair of stationary spaced apart electrical contacts, a third electrical contact mounted on said clamp insulated from said bearing and arranged between said pair of stationary contacts, means including a pair of biasing coil springs extending in opposite directions connected to said clamp for exerting a centering force on said outer bearing race through said clamp for centering said third electrical contact between said pair of stationary contacts out of electrical contact therewith, means for electrically connecting together said pair of stationary contacts, means for electrically connecting a source of electrical power supply to said third contact and to said pair of stationary contacts, and means for connecting a signal device in circuit with said contacts for operation by closure of said electrical circuit between said third contact and one of said stationary contacts on movement of said outer bearing race by friction in said bearings on rotation of said rotatable member in either direction.

HAROLD M. MARTIN.

REFERENCES CITED

The following references are of record in the file of this patent:

FOREIGN PATENTS

| Number | Country | Date |
|---|---|---|
| 4,579 | Great Britain | Sept. 26, 1883 |
| 670,184 | Germany | Jan. 13, 1939 |